United States Patent Office 3,074,999
Patented Jan. 22, 1963

3,074,999
PREPARATION OF DIALKYL 2-METHYLENE-GLUTARATES

Michael M. Rauhut, Stamford, and Helen Currier, Greenwich, Conn., assignors to American Cyanamid Company, New York, N.Y., a corporation of Maine
No Drawing. Filed Dec. 31, 1958, Ser. No. 784,025
6 Claims. (Cl. 260—485)

The present invention relates to the preparation of esters of 2-methyleneglutaric acid. More particularly, the instant discovery concerns contacting alkyl acrylates with an organic tertiary phosphine to produce the corresponding dialkyl 2-methyleneglutarate.

According to the present invention it has been found that alkyl acrylates corresponding to the formula

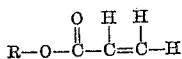

wherein R is an alkyl group having from 1 to 12 carbon atoms, react in the presence of organic tertiary phosphines conforming to the formula

to produce the corresponding dialkyl 2-methyleneglutarates, Y in the above formula including substituted and unsubstituted, branched and straight chain, saturated and unsaturated alkyl groups, substituted and unsubstituted, saturated and unsaturated alicyclic groups, substituted and unsubstituted aryl groups.

A typical embodiment of the instant discovery involves establishing a solution of tributylphosphine in acetonitrile and, while agitating the solution, adding ethyl acrylate thereto. Since the reaction is exothermic and the temperature generally tends to increase considerably a suitable cooling means, such as an ice bath, may be employed to prevent an excessive increase in temperature, as will be seen hereinafter.

While the reaction of the present invention is preferably carried out in the presence of an inert organic solvent, for optimum results, preparation of the products of the instant invention without the use of a solvent is also contemplated. Among the solvents suitable for the instant process are those which are non-reactive, i.e., inert, or substantially non-reactive with the reaction components under the reaction conditions, such as tetrahydrofuran, methyl ethyl ketone, dioxane, acetonitrile, and the like.

A wide range of temperatures may be employed, pursuant to the present invention. The reaction is effective at temperatures in the range of about −10° C. to about 100° C. Of course, when a solvent is used, reaction is best carried out at temperatures below the boiling point of the solvent. Generally, temperatures in the range of about 20° C. to about 50° C. are preferred.

Although reaction takes place quite readily at atmospheric pressure, sub-atmospheric and super-atmospheric pressures may be employed. In addition, the process of the present invention may be continuous, semi-continuous or batch.

It has been found that best results are obtained by carrying out the reaction at a pH in the range of about 6.5 to about 11. Also, highest yields are obtained under substantially anhydrous conditions, since it has been found that product yield decreases as the amount of water present increases. Surprisingly enough, however, fairly satisfactory yields may be realized with as much as about 50 percent by weight of water, basis the total weight of alkyl acrylate reactant.

The ratio of alkyl acrylate reactant to tertiary organic phosphine suitable for the present invention is preferably above about 1:1, but there really is no lower limit other than that dictated by practicality. For example, a suitable but impractical ratio is 1:5 or lower, since the greater the amount of tertiary organic phosphine present the faster the reaction.

It has been discovered that the intensity of catalytic activity provided by the organic phosphine has a direct bearing upon the concentration of alkyl acrylate preferably employed. For example, less tributylphosphine than tris(cyanoethyl)phosphine is required for the same amount of product yield, all other factors being equal.

As to the upper concentration limit, it has been found that proportions above 200:1, alkyl acrylate to tertiary organic phosphine, are less and less effective as the proportion increases. Preferably, concentrations in the range of 130:1 to 5:1 are employed.

While any sequence of admixing is suitable, according to the present invention, a preferred embodiment, as indicated above, involves establishing a mixture of the tertiary organic phosphine in an inert organic solvent and adding the alkyl acrylate thereto. Simultaneously feeding separate streams of the reaction components to a reaction zone is also effective.

Typical alkyl acrylate reactants contemplated herein are isooctylacrylate, 2-ethylhexyl acrylate, methyl acrylate, lauryl acrylate, and, of course, ethyl acrylate, and many others.

Included among the tertiary organic phosphines suitable for the instant discovery are trimethylphosphine, trioctylphosphine, triisobutylphosphine, tricyclopentylphosphine, tricyclohexenylphosphine, triphenylphosphine, tris(2-carboxyethyl)phosphine, trivinylphosphine, tris(2-butoxyethyl)phosphine, tristrifluoroethylphosphine.

Other suitable substituents for the tertiary organic phosphines are cyano, amino, hydroxyl, carbamyl, acyloxy, carbalkoxy, carboxy, alkyloxy, aryl, aryloxy, and the like.

The instant invention will best be understood by reference to the following examples in which the proportions are given in percent by weight, unless otherwise indicated:

EXAMPLE I

Ethyl acrylate (555 grams, 5.55 moles) is added dropwise and continuously during a 1-hour period to a stirred solution of 10 grams (0.049 mole) of tributylphosphine in 110 milliliters of acetonitrile. Admixture of these components is made to take place under an atmosphere of nitrogen. The temperature of the mixture is maintained at 40° C.–45° C. by occasional cooling, as needed, in an ice bath. The reaction mixture is stirred for an additional 3 hours and then distilled under reduced pressure to obtain 173 grams (31 percent) of unreacted ethyl acrylate and 253 grams (46 percent) of diethyl 2-methyleneglutarate, boiling point 125° C.–128° C. (14 millimeters mercury pressure).

Redistillation of the diethyl 2-methyleneglutarate product yields an analytical sample having a boiling point of 109° C–110° C. (6 millimeters mercury pressure), and a refractive index of $n_D^{25}$ 1.0392. Analysis calculated for $C_{10}H_{16}O_4$: C, 59.98; H, 8.05. Found: C, 59.62; H, 8.27. Infrared, ultraviolet and mass spectroscopic analyses further substantiate the elemental analysis.

EXAMPLE II

A mixture of 16.7 grams (0.05 mole) of tris(2-carbethoxyethyl)phosphine, 25.0 grams (0.25 mole) of ethyl acrylate, and 25 milliliters of acetonitrile is established and stored under an atmosphere of nitrogen in the dark for 1 day. Reaction takes place and the infrared spectrum of the resulting reaction mixture indicates that the ethyl acrylate has completely reacted. The solvent is removed under reduced pressure (30–70 milliliters mercury) and the residue is distilled to obtain 14.3 grams (47 percent) of diethyl 2-methyleneglutarate, boiling point 117° C.–120° C. (12 millimeters mercury pressure).

EXAMPLE III

The following runs are carried out, in every essential respect, as in Example I, above, unless otherwise indicated:

Table I

| Run No. | Tertiary phosphine | Moles of phosphine | Moles of ethyl acrylate | Molar ratio acrylate/ phosphine | Acetonitrile (milliliters) | Reaction time | Yields [1] | |
|---|---|---|---|---|---|---|---|---|
| | | | | | | | Recovered ethyl acrylate (percent) | Diethyl-2- methylene- glutarate (percent) |
| 1 | Tributylphosphine [2] | 0.0068 | 0.090 | 13.0 | 25 | 3 days | 0 | 75 |
| 2 | ---do--- | 0.014 | 0.180 | 13.0 | 50 | 24 hours | 0 | 61 |
| 3 | ---do.[3] | 0.0099 | 0.090 | 9.1 | 25 | ---do--- | 37 | 19 |
| 4 | Tris(carbethoxyethyl)phosphine | 0.0012 | 0.10 | 83.0 | 0 | 28 days | 57 | 18 |
| 5 | ---do--- | 0.016 | 0.090 | 5.6 | 25 | 3 days | 0 | 54 |
| 6 | Tris(cyanoethyl)phosphine | 0.016 | 0.090 | 5.6 | 25 | ---do--- | 0 | 49 |

[1] Yields are based on the amount of ethyl acrylate reactant used.
[2] The phosphine is added to a solution of ethyl acrylate in acetonitrile. After a short induction period the temperature rapidly rises to 70° C.
[3] 1.0 gram of water is added to the phosphine-acetonitrile solution before the ethyl acrylate is added.

EXAMPLE IV

Methyl acrylate (16.2 grams, 0.2 mole) is added dropwise and continuously during a 15-minute period to a stirred solution of 1.0 gram of tris(2-phenylethyl)phosphine in 5 milliliters of purified dioxane under an atmosphere of nitrogen. The temperature is maintained at 20° C.–25° C. by cooling, as needed, in an ice bath. The reaction mixture is stirred at room temperature for an additional 30 minutes and then distilled to obtain dimethyl 2-methyleneglutarate having a boiling point of 80° C. (3 millimeters mercury pressure).

EXAMPLE V

Lauryl acrylate (55.2 grams, 0.2 mole) is added dropwise and continuously during a 15-minute period to a stirred solution of 1.0 gram of tris(2-butoxyethyl)phosphine in 3 milliliters of tetrahydrofuran under an atmosphere of nitrogen. The temperature of the mixture is maintained at 20° C.–25° C. by occasional cooling, as needed. The reaction mixture is stirred an additional 2 hours at room temperature and then stripped of volatile components under reduced pressure. The residual colorless liquid is comprised essentially of didodecyl 2-methyleneglutarate, identified by its infrared and nuclear magnetic resonance spectra.

The product esters of the present invention are polymerizable to solid polymers by emulsion polymerization or in the presence of bis-azoisobutyronitrile, or the like.

While the present invention has been described in detail as to specific embodiments thereof, it is not intended that these details should exert undue restrictions upon the scope of the invention, unless, of course, they are included in the appended claims.

We claim:

1. A method of preparing a dialkyl 2-methyleneglutarate which consists essentially in bringing an alkyl acrylate conforming to the formula

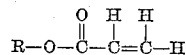

wherein R is an alkyl group having from 1 to 12 carbon atoms, into intimate contact with a tertiary organic phosphine, while maintaining the temperature of the resulting mixture in the range of about −10° C. to about 100° C. during reaction, distilling the resulting reaction mixture to remove unreacted starting materials, and thus recovering the corresponding dialkyl 2-methyleneglutarate.

2. The method according to claim 1 wherein a solution mixture of the tertiary organic phosphine in an inert organic solvent is established and the alkyl acrylate added thereto.

3. The method according to claim 1 wherein the tertiary organic phosphine is tributylphosphine.

4. The method according to claim 1 wherein the tertiary organic phosphine is tris(cyanoethyl)phosphine.

5. The method according to claim 1 wherein the tertiary organic phosphine is tris(carbethoxyethyl)phosphine.

6. A method which consists essentially in bringing ethyl acrylate into intimate contact with a tertiary organic phosphine in the presence of an inert organic solvent, while maintaining the temperature of the resulting mixture in the range of about −10° C. to about 100° C. during reaction, distilling the resulting reaction mixture to remove unreacted starting materials, and thus recovering the resulting diethyl 2-methyleneglutarate.

References Cited in the file of this patent

FOREIGN PATENTS 927,384    Germany    May 9, 1955
1,134,751    France    Apr. 17, 1957

OTHER REFERENCES

Goss et al.: J. Chem. Soc. (London) 127, 2779–2780 (1925).

Horner et al.: Ann. Chem. Justus Liebigs, 591, 108–117 (1955).

Fuson: "Advanced Organic Chemistry," 1950, pp. 612–614.

Bauer, Chem. Abstracts 46, 8409 (1952).